US009979228B2

United States Patent
Nishigai et al.

(10) Patent No.: US 9,979,228 B2
(45) Date of Patent: May 22, 2018

(54) ENERGY MANAGEMENT APPARATUS AND METHOD OF CONTROLLING THE SAME

(71) Applicant: KYOCERA Corporation, Kyoto (JP)

(72) Inventors: Takanobu Nishigai, Ebina (JP); Masaya Kojima, Kawasaki (JP); Ryo Noguchi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 303 days.

(21) Appl. No.: 14/420,853

(22) PCT Filed: Aug. 12, 2013

(86) PCT No.: PCT/JP2013/004837
§ 371 (c)(1),
(2) Date: Feb. 10, 2015

(87) PCT Pub. No.: WO2014/027462
PCT Pub. Date: Feb. 20, 2014

(65) Prior Publication Data
US 2015/0244208 A1 Aug. 27, 2015

(30) Foreign Application Priority Data
Aug. 13, 2012 (JP) ................................ 2012-179389

(51) Int. Cl.
H02J 9/00 (2006.01)
H02J 9/06 (2006.01)

(52) U.S. Cl.
CPC .............. H02J 9/061 (2013.01); H02J 9/002 (2013.01); Y10T 307/625 (2015.04)

(58) Field of Classification Search
CPC ...................................... H02J 9/00; H02J 9/04
(Continued)

(56) References Cited

U.S. PATENT DOCUMENTS 8,438,348 B2    5/2013   Hosaka
2002/0033692 A1 3/2002   Sakai et al.
(Continued)

FOREIGN PATENT DOCUMENTS

JP   07271481 A   * 10/1995
JP   H07-271481 A   10/1995
(Continued)

OTHER PUBLICATIONS

Extended European Search Report dated Feb. 15, 2016 issued by European Patent Office for Counterpart European Application No. 13879534.9.
(Continued)

Primary Examiner — Rexford Barnie
Assistant Examiner — Joseph Inge
(74) Attorney, Agent, or Firm — Procopio Cory Hargreaves and Savitch LLP

(57) ABSTRACT

An energy management apparatus capable of taking an appropriate measure in the event of a power failure and a method of controlling the energy management system will be provided. A storage medium 25, a power input unit 122 for receiving power supply, a backup power source 123 for supplying power when power supply to the power input unit 122 from a grid power source 50 stops, and a control unit 124, when the power supply to the power input unit 122 from the grid power source 50 stops for a period equal to or longer than a predetermined period, for carrying out a suspension processing of the storage medium 25 are provided.

10 Claims, 3 Drawing Sheets

(58) Field of Classification Search
USPC .......................................................... 307/66
See application file for complete search history.

(56) References Cited

U.S. PATENT DOCUMENTS

| 2005/0024905 | A1* | 2/2005 | Shiojima ................. H02J 9/061 363/110 |
| 2009/0249008 | A1 | 10/2009 | Hosaka |
| 2010/0093223 | A1* | 4/2010 | Pappas .................... G06F 1/263 439/660 |
| 2010/0142307 | A1 | 6/2010 | Sartore |
| 2011/0185196 | A1* | 7/2011 | Asano ................. B60L 11/1809 713/300 |

FOREIGN PATENT DOCUMENTS

| JP | H09-171421 A | 6/1997 |
| JP | 2002-108515 A | 4/2002 |
| JP | 2003-309928 A | 10/2003 |
| JP | 2009-237881 A | 10/2009 |
| JP | 2011-155710 A | 8/2011 |
| JP | 2012-115003 A | 6/2012 |
| WO | 2012/025972 A1 | 3/2012 |

OTHER PUBLICATIONS

International Search Report; PCT/JP2013/004837; dated Sep. 3, 2013.
Written Opinion of the International Searching Authority; PCT/JP2013/004837; dated Sep. 3, 2013; with concise explanation.
Office Action dated Jan. 19, 2016, issued in counterpart Japanese application No. 2014-530471.
Office Action dated Nov. 22, 2016 by Japanese Patent Office in counterpart Japanese Patent Application No. 2014-530471.

\* cited by examiner

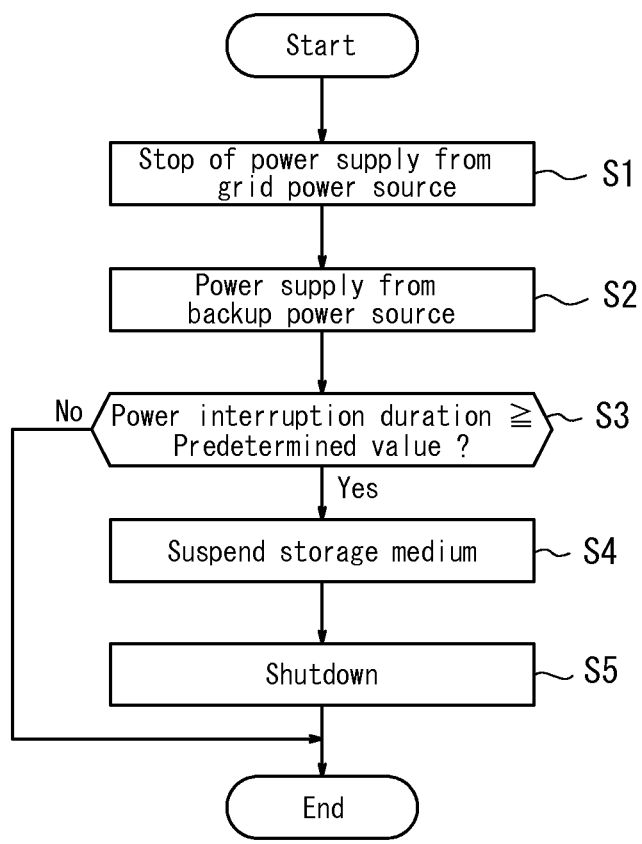

ENERGY MANAGEMENT APPARATUS AND METHOD OF CONTROLLING THE SAME

CROSS REFERENCE TO RELATED APPLICATION

This application claims priority to and the benefit of Japanese Patent Application No. 2012-179389 (filed on Aug. 13, 2012), the entire contents of which are incorporated herein by reference.

TECHNICAL FIELD

The present invention relates to an energy management apparatus and a method of controlling the energy management apparatus.

BACKGROUND ART

In recent years, there is known a technique that, by using an energy management apparatus (for example, HEMS: Home Energy Management System) provided to each power consumer, controls a load apparatus and a distributed power source that are provided to the power consumer (see Patent Document 1).

RELATED ART DOCUMENT

Patent Document

Patent Document 1: Japanese Patent Application Laid-Open Publication No. 2003-309928

SUMMARY OF INVENTION

Technical Problem

Here, in the event of a power failure, power supply to the energy management apparatus and the load apparatus stops. When an energy management system is provided with the distributed power source, the distributed power source may be controlled to supply power during the power failure. As a measure to be taken in the event of the power failure, however, the power supply from the distributed power source alone is inadequate. Therefore, an appropriate measure to be taken in the event of the power failure has been desired.

Accordingly, an object of the present invention in view of the above problem is to provide an energy management apparatus capable of taking an appropriate measure in the event of the power failure, and a method of controlling the energy management apparatus.

Solution to Problem

In order to solve the above problem, an energy management apparatus according to the present invention is an energy management apparatus provided to a power consumer's facility for managing at least a power state of a load apparatus or a distributed power source in the power consumer's facility, the energy management apparatus including:

a storage medium;
a power input unit for receiving power supply;
a backup power source for supplying power when power supply to the power input unit from a grid power source stops; and a control unit, when power supply to the power input unit from the grid power source stops for a period equal to or longer than a predetermined period, for carrying out a suspension processing of the storage medium.

The energy management apparatus according to the present invention, wherein
the control unit, after carrying out the suspension processing of the storage medium, shuts down the energy management apparatus.

The energy management apparatus according to the present invention, wherein
the control unit resumes a system operation when the distributed power source starts power supply after the power supply from the grid power source stops.

The energy management apparatus according to the present invention, wherein
the control unit monitors a charging amount of the backup power source and, when the distributed power source starts the power supply and, simultaneously, the charging amount is at a predetermined value or more, resumes the system operation of the energy management apparatus.

The energy management apparatus according to the present invention, wherein
the predetermined value is a total amount of a value of power necessary for the suspension processing of the storage medium and a value of power necessary for maintaining the system operation for the predetermined period.

The energy management apparatus according to the present invention, wherein
the backup power source has a capacity that allows for power supply to the energy management apparatus during the predetermined period and also power supply during the suspension processing of the storage medium.

The energy management apparatus according to the present invention, wherein
the predetermined period is maximum duration of the stop of the power supply to be defined as momentary power interruption by a power company, and the stop of the power supply longer than the maximum duration is defined as a power failure.

The energy management apparatus according to the present invention, wherein
the predetermined period is two seconds.

A method of controlling an energy management apparatus according to the present invention is a method of controlling an energy management apparatus provided to a power consumer's facility for managing a power state of a load apparatus or a distributed power source in the power consumer's facility, the method including:

a step of supplying power from a backup power source when power supply to a power input unit stops; and
a step of carrying out a suspension processing of a storage medium when power supply to the power input unit from a grid power source stops for a period equal to or longer than a predetermined period.

The method of controlling the energy management apparatus according to the present invention, including
a step of shutting down the energy management apparatus after carrying out the suspension processing of the storage medium.

The method of controlling the energy management apparatus according to the present invention, including
a step of resuming a system operation when the distributed power source starts power supply after the power supply from the grid power source stops.

The method of controlling the energy management apparatus according to the present invention, wherein a charging amount of the backup power source is monitored and, when the distributed power source starts the power supply and, simultaneously, the charging amount is at a predetermined value or more, the system operation of the energy management apparatus is resumed.

The method of controlling the energy management apparatus according to the present invention, wherein the predetermined value is a total amount of a value of power necessary for the suspension of the storage medium and a value of power necessary for maintaining the system operation for the predetermined period.

The method of controlling the energy management apparatus according to the present invention, wherein the backup power source has a capacity that allows for power supply to the energy management apparatus for the predetermined period and also power supply during the suspension processing of the storage medium.

The method of controlling the energy management apparatus according to the present invention, wherein the predetermined period is maximum duration of the stop of the power supply to be defined as momentary power interruption by a power company, and the stop of the power supply longer than the maximum duration is defined as a power failure.

The method of controlling the energy management apparatus according to the present invention, wherein the predetermined period is two seconds.

Effect of the Invention

According to the energy management apparatus and a method of controlling the energy management apparatus of the present invention, an appropriate measure may be taken in the event of the power failure.

BRIEF DESCRIPTION OF DRAWINGS

FIG. 3 is a flowchart illustrating an operation of the energy management apparatus according to one embodiment of the present invention.

DESCRIPTION OF EMBODIMENT

Hereinafter, an embodiment of the present invention will be described.

Embodiment

First, an energy management system including an energy management apparatus according to one embodiment of the present invention will be described. The energy management system including the energy management apparatus according to the present embodiment includes a distributed power source, in order to receive power supply in addition to power supply from a power system (a grid power source). The distributed power source preferably includes a system for supplying power by employing, for example, solar power generation and a battery system capable of storing and discharging power.

The power supply system is not restrictive to the system for supplying power by employing the solar power generation but may be a variety of power generation systems such as a fuel cell system including a fuel cell such as, for example, SOFC (Solid Oxide Fuel Cell). According to the present embodiment, hereinafter, an example having a solar power generation system as the power supply system as well as a battery unit as the battery system will be described.

Figure 1:
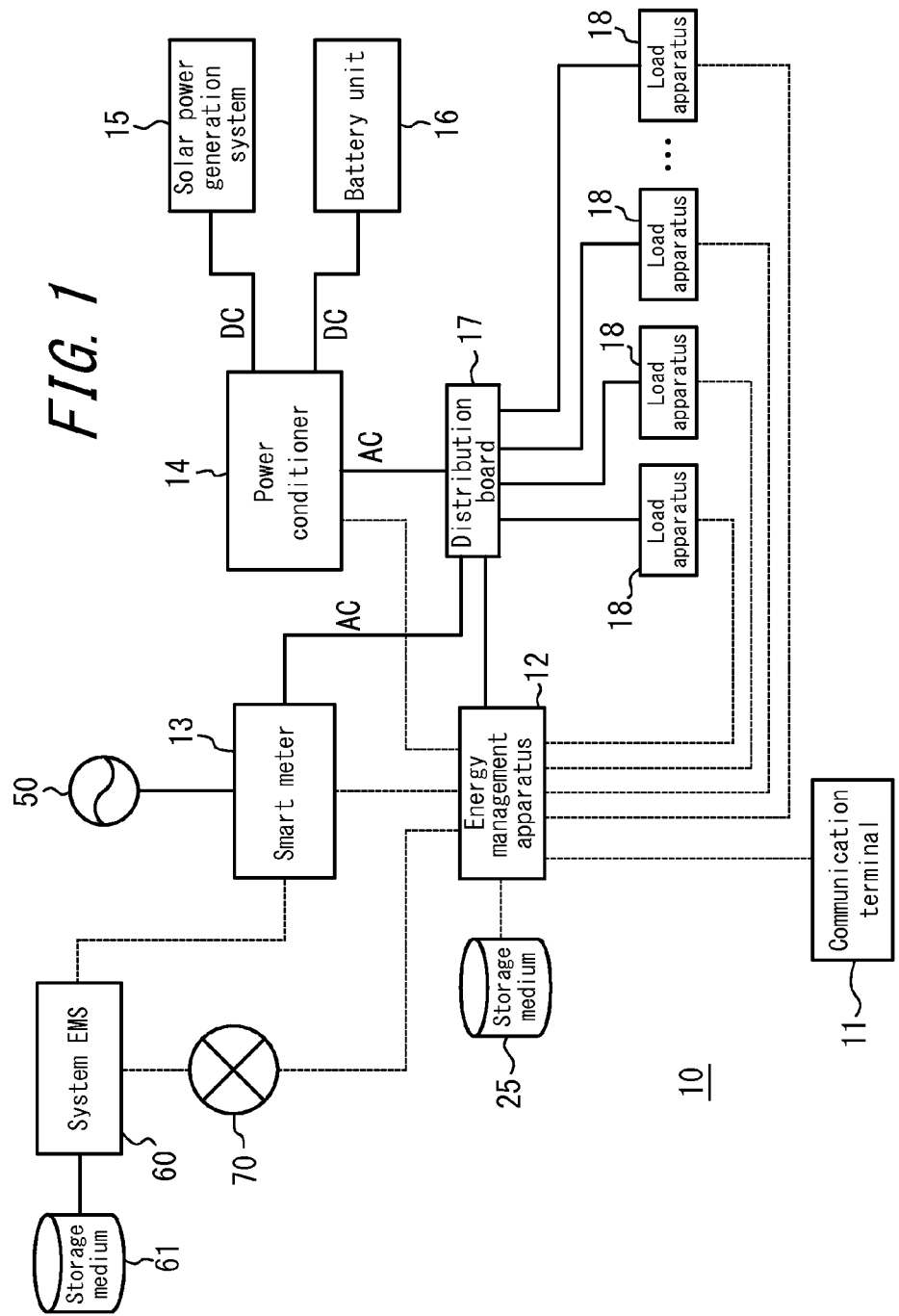
FIG. 1 is a block diagram illustrating a schematic configuration of an energy management system including an energy management apparatus according to one embodiment of the present invention.

FIG. 1 is a block diagram illustrating a schematic configuration of an energy management system 10 including the energy management apparatus according to one embodiment of the present invention. The energy management system 10 according to one embodiment of the present invention includes a communication terminal 11, an energy management apparatus 12, a smart meter 13, a power conditioner 14, a solar power generation system 15, a battery unit 16, a distribution board 17, and load apparatuses 18.

In FIG. 1, a solid line connecting each functional block represents power flow. In FIG. 1, also, a broken line connecting each functional block represents a flow of a communication of a control signal or information. The communication indicated by the broken line may be a wired communication or a radio communication. The radio communication is carried out via a wireless router. The wireless router may be incorporated in the energy management apparatus 12, or provided separately therefrom.

For the communication of the control signal and the information, a variety of methods including a physical layer and a logical layer may be employed. For example, the communication among the energy management device 12, the communication terminal 11, the smart meter 13, and the power conditioner 14 may employ a short-distance communication method such as ZigBee (registered trademark). Also, the communication between the energy management apparatus 12 and the load apparatus 18 may employ various transmission media including an infrared communication, a power line communication (PLC: Power Line Communication), and the like. Further, on the physical layer applicable to each communication, various communication protocols such as, for example, a communication protocol such as ZigBee SEP2.0 (Smart Energy Profile2.0), ECHONET Lite (registered trademark), and the like those specifying the logical layer alone may be operated. Hereinafter, an example where the energy management apparatus 12 employs ECHONET Lite (registered trademark) for the communication with the communication terminal 11, the smart meter 13, the power conditioner 14, and the load apparatus 18 will be described.

The energy management system 10 may supply, other than the power supplied from a grid power source 50, power generated by the solar power generation system 15 and power discharged out of power stored in the battery unit 16 to the load apparatuses 18 and the energy management apparatus 12.

The communication terminal 11 displays information transmitted by the energy management apparatus 12. For example, the communication terminal 11 displays information on power consumption history and the like.

The energy management apparatus 12 controls and manages power of each apparatus in the energy management system 10 illustrated in FIG. 1. A configuration of the energy management apparatus 12 will be described in detail later.

The smart meter 13 is connected to the grid power source 50 and measures power supplied therefrom. The smart meter 13 is also connected to the distribution board 17 and measures power generated by the solar power generation system 15 and sold to a power company from the power conditioner 14 via the distribution board 17. The smart meter 13 may notify the energy management apparatus 12 of the power thus measured.

Also, the smart meter 13 may receive, from a system EMS (Energy Management System) 60, information such as, for example, a prediction about power and the like. Here, the system EMS 60 is an equipment for carrying out various predictions and control in association with power and generally installed in the power company. As the system EMS 60, one constituting, for example, MDMS (Meter Data Management System) may be employed. The system EMS 60 includes a storage medium 61 for storing various information on power and may collect and store information on a result of measurement carried out by the smart meter 13. Also, the system EMS 60 may be connected to a network 70, which is an external network such as the Internet.

The power conditioner 14 converts DC power supplied from the solar power generation system 15 and the battery unit 16 into AC power. Also, the power conditioner 14 supplies the AC power to each of the load apparatuses 18 via a plurality of branches branched off from the distribution board 17. Also, the power conditioner 14, when there is excess power generated by the solar power generation system 15, may sell the AC power to the power company via the distribution board 17. Further, the power conditioner 14 may convert AC power supplied from the grid power source 50 into DC power to charge the battery unit 16.

The solar power generation system 15 generates power by using the solar light. Therefore, the solar power generation system 15 includes a solar cell and converts solar energy into DC power. According to the present embodiment, the solar power generation system 15 is assumed to include a solar panel installed on, for example, a roof of a house and generate power by using the solar light. According to the present invention, however, the solar power generation system 15 may have any configuration as long as being capable of converting the solar energy into power.

The power generated by the solar power generation system 15, as mentioned above, is converted into the AC power by the power conditioner 14 and may be supplied to each of the load apparatuses 18 and/or sold to the power company. Also, the power generated by the solar power generation system 15 may be used to charge the battery unit 16 and, further, supplied to the load apparatus 18 without being converted into the AC power.

The battery unit 16 includes a battery and may supply power by discharging power stored in the battery. Also, the battery unit 16 may store the power supplied from the grid power source 50 and the power supplied from the solar power generation system 15. As illustrated in FIG. 1, the power discharged from the battery unit 16 may be supplied to each of the load apparatuses 18 and the energy management apparatus 12. In order to supply the power discharged from the battery unit 16 to each of the load apparatuses 18 and the energy management apparatus 12, power supply is switched over from the power supplied from the grid power source 50 to the power discharged from the battery unit 16.

The distribution board 17 separates supplied power into a plurality of branches and distributes the separated power to each of the load apparatuses 18. Here, some branches are directly connected to typical load apparatuses 18 of high power consumption, and others are summarized in each room. The load apparatuses 18 connected to the former branches are, for example, an air conditioning, a refrigerator, an induction heating (IH) cooker, and the like. The load apparatus 18 connected to the latter branches is a load apparatus, a type of which is indefinite, connected to an outlet installed in each room.

In FIG. 1, any number of the load apparatuses 18 may be connected to the energy management system 10. These load apparatuses 18 are various electrical appliances such as, for example, a TV set, the air conditioning, the refrigerator, and the like. These load apparatuses 18 are connected to the power conditioner 14 via the distribution board 17 in order to receive power supply.

Next, the energy management apparatus 12 will be further described.

Figure 2:
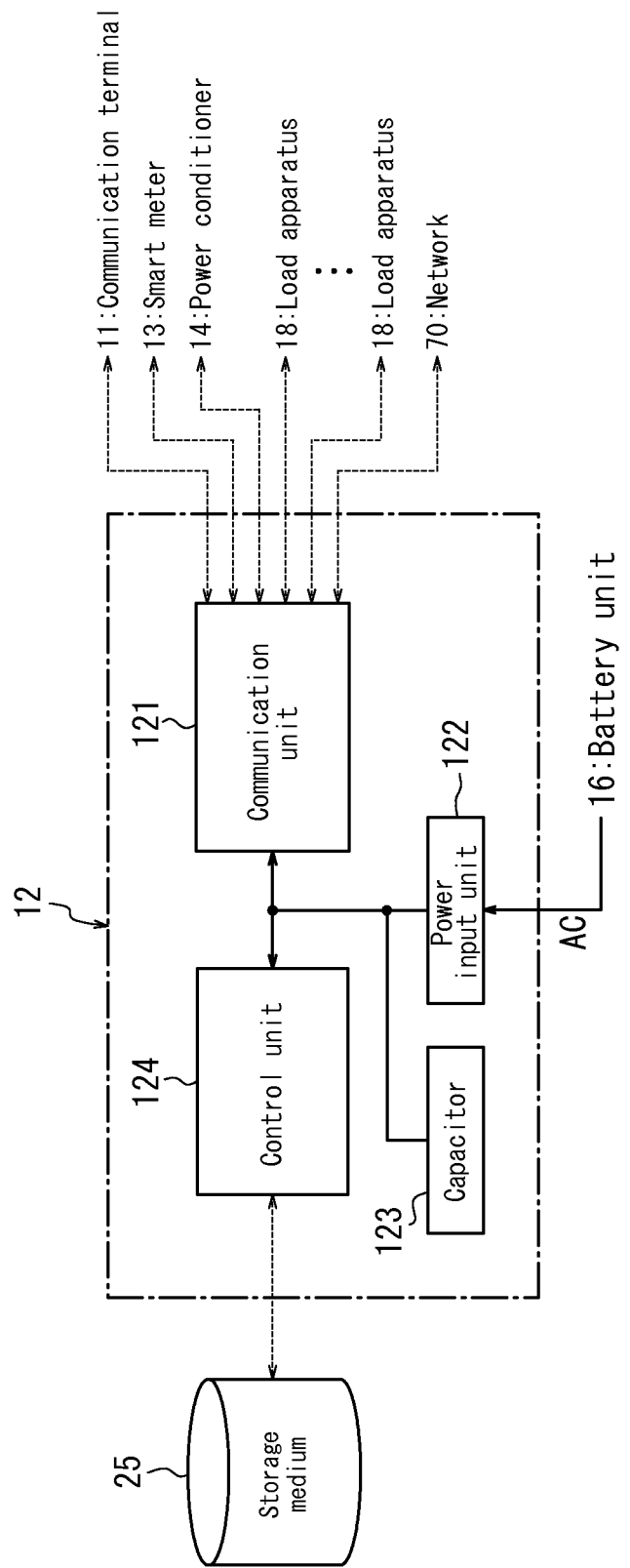
FIG. 2 is a functional block diagram illustrating a schematic configuration of the energy management apparatus according to one embodiment of the present invention.

FIG. 2 is a functional block diagram illustrating a schematic configuration of the energy management apparatus 12 according to one embodiment of the present invention. The energy management apparatus 12 is, for example, HEMS and includes a communication unit 121, a power input unit 122, a backup power source 123, and a control unit 124.

The communication unit 121 is, for example, an interface and exchanges the control signal and various information from the control unit 124 in communication with the communication terminal 11, the smart meter 13, the power conditioner 14, and the load apparatus 18.

For example, the communication unit 121 may receive, from the smart meter 13, power purchased from the grid power source 50 and/or power sold thereto. Also, the communication unit 121 may obtain information on a demand response (Demand Response: DR) from, for example, the power company via the smart meter 13. The communication unit 121 may receive, from the power conditioner 14, the power supplied from the solar power generation system 15, the battery unit 16, and the grid power source 50 to the load apparatus 18 through the plurality of branches branched off from the distribution board 17, via a sensor provided to each of the branches. The communication unit 121 may directly obtain, from the power conditioner 14, an amount of the power stored (i.e., stored power) in the battery unit 16. The communication unit 121 may directly obtain power consumption from each of the load apparatuses 18. The communication unit 121 may obtain various information from the network 70.

Further, the communication unit 121 may receive the control signal from the communication terminal 11 and notifies the communication terminal 11 of information about a state of control and management of power conducted by the energy management system 10. By way of example, an example employing ECHONET LITE (registered trademark) will be described.

The power input unit 122 receives power supply from the grid power source 50, the solar power generation system 15, and the battery unit 16 via the smart meter 13 and the distribution board 17.

The backup power source 123 may be a capacitor such as, for example, a super capacitor and charged by using the power supply received by the power input unit 122 (that is, the power supply from the grid power source 50 and the like). The backup power source 123, when power supply from the grid power source 50 to the power input unit 122 stops due to a power failure, discharges the power stored in the backup power source 123 itself and supplies power, in place of the grid power source 50, to the energy management apparatus 12. That is, the backup power source 123 serves as a power source for temporarily supplying the power during the power failure. Therefore, the backup power source 123, during the power failure, allows the energy management apparatus 12 to continue an operation for a predetermined period within a range of the power stored in the backup power source 123. That is, the energy management apparatus 12, as described later, operates within the range of the power stored in the backup power source 123 for the predetermined period and carries out the suspension processing of the storage medium 25.

The control unit 124, based on the various information obtained by the communication unit 121, generates the control signal for controlling the power supplied to each apparatus in the energy management system 10 and/or the information to be sent to the communication terminal 11.

Also, the control unit 124, in order to manage the power supplied to each apparatus in the energy management system 10, stores the information obtained by the communication unit 121.

The control unit 124 includes the storage medium 25 for storing various information collected. The storage medium 25 may be either externally connected to the energy management apparatus 12 or incorporated therein. The storage medium 25 is preferably an SD card.

Further, the control unit 124 monitors the power supply to the power input unit 122 from the grid power source 50 and determines the presence/absence of the power supply. Then, the communication terminal 124 determines whether interruption duration of the power supply (hereinafter, referred to as power interruption duration) is equal to or longer than a predetermined period. The control unit 124, when the power interruption duration is equal to or longer than the predetermined period, carries out the suspension processing of the storage medium 25. On the other hand, when the power interruption duration is shorter than the predetermined period, the control unit 124 does not carry out the suspension processing of the storage medium 25. The predetermined period is preferably 2 seconds but not restrictive thereto. That is, the control unit 124, when the power interruption duration is shorter than 2 seconds, determines that the power supply was momentarily stopped (hereinafter, referred to as momentary power interruption) and does not carry out the suspension processing of the storage medium 24. Here, the momentary power interruption is a phenomenon where the power supply from the grid power source 50 is momentarily stopped due to a lightning strike and the like.

In the event of the momentary power interruption, accordingly, a normal operation may be continued without shutting down the apparatus.

In particular, as the suspension processing of the storage medium 25, the control unit 124, when the power interruption duration is equal to or longer than the predetermined period, inhibits access to the storage medium 25. Then, the control unit 124 unmounts the storage medium 25 in order to disconnect the storage medium 25 from the system. Thereby, in the event of a power failure, damaging, or causing inconsistency of, information in a database stored in the storage medium 25 may be prevented. Also, in order to substantialize such a configuration, the backup power source 123 preferably has a capacity that allows for power supply to the energy management apparatus 12 for the predetermined period and power supply during the suspension processing of the storage medium 25.

Further, the control unit 124 shuts down the energy management apparatus 12 preferably after the suspension processing of the storage medium 25. In this case, the backup power source 123 preferably has a capacity that allows for the power supply to the energy management apparatus 12 for the predetermined period, the power supply during the suspension processing of the storage medium 25, and power supply for shutting down the energy management apparatus 12.

When there is the power supply from the solar power generation system 15 or the battery unit 16, the control unit 124 of the energy management apparatus 12, after the shutdown, by using the power supply from the solar power generation system 15 or the battery unit 16, resumes the operation of the energy management apparatus 12, that is, carries out a restarting operation of the energy management apparatus 12. In this case, the control unit 124 preferably monitors a charging voltage value of the backup power source 123 and, when the charging voltage value is at a predetermined value or higher, controls the energy management apparatus 12 to start a system operation. The predetermined value is a total amount of a value of the power for operating the energy management apparatus 12 preferably for the aforementioned predetermined period and a value of the power for carrying out the suspension processing of the storage medium 25.

Here, the power interruption duration will be additionally described.

Materials presented by TEPCO, "A measure taken in case of momentary voltage drop in transmission system at Fukushima Daiichi nuclear power plant" (URL:http://www.tepco.co.jp/cc/press/betu12_j/images/120511j0301.pdf), state as follows.

"In the event of a two-phase or three-phase short circuit (earth fault) occurred in equipment constituting a power system (including a one-phase earth fault in a system in direct contact with the ground) due to a lightning strike and the like, accidental equipment shall be detected by using a protection relay and disconnected by opening a breaker, and a phenomenon where a momentary drop in a voltage occurs over a wide range around a failure point for a very short period (approximately 0.07 to 2 seconds) is referred to as the momentary voltage drop."

"Since duration of the momentary voltage drop that occurred on Jan. 17, 2012 was 0.08 seconds, and a maximum period necessary for re-closing in the event of a lighting strike to Yorunomori line is considered to be 2 seconds, the use of the present definition is considered as reasonable. In this report, therefore, based on the above definition, the maximum period necessary for the re-closing in the event of the lighting strike to the Yorunomori line is considered to be 2 seconds, and a case where duration of no-voltage due to the momentary voltage drop is 2 seconds will be considered." That is, it is prescribed that maximum duration of the power interruption to be defined as the momentary power interruption is 2 seconds and the power interruption duration longer than that is defined as a power failure. The present embodiment assumes a service area of TEPCO by way of example, and in this case a predetermined value of the power interruption duration is preferably 2 seconds corresponding to the maximum duration of the power interruption to be defined as the momentary power interruption as described above. However, when each country or each power company uniquely sets the value, such a value is preferably used as the predetermined value.

Next, an operation of the energy management apparatus 12 according to one embodiment of the present invention will be described with reference to a flowchart illustrated in FIG. 3.

First, the power supply to the power input unit 122 of the energy management apparatus 12 from the grid power source 50 stops (step S1). The backup power source 123, when the power supply to the power input unit 122 from the grid power source 50 stops, discharges the power stored therein as a substitute for the power supply to the energy management apparatus 12 from the grid power supply 50 (step S2).

Next, the control unit 124 determines whether the power interruption duration is equal to or longer than the predetermined period (step S3). When the power interruption duration is equal to or longer than the predetermined period, the control unit 124 proceeds to step S4. On the other hand, when the power interruption duration is shorter than the predetermined period, the operation ends.

At step S3, when the power interruption duration is equal to or longer than the predetermined period, the control unit 124 determines that there is a power failure and carries out the suspension processing of the storage medium 24 (step S4). In particular, the control unit 124, when the power interruption duration of power supply is equal to or longer than the predetermined period, prohibits the access to the storage medium 25. Then, the control unit 124 unmounts the storage medium 25 and thereby disconnects the storage medium 25 from the system.

Then, the control unit 124 shuts down the energy management apparatus 12 preferably after the suspension processing of the storage medium 25.

According to the present invention, as described above, when the power interruption duration is equal to or longer than the predetermined period, the control unit 124 determines that there is a power failure and carries out the suspension processing of the storage medium 24. Thereby, in the event of the power failure, the data stored in the storage medium 25 may be securely protected. Further, the control unit 124, when the power interruption duration is shorter than the predetermined period, determines that there was the momentary power interruption and avoids carrying out the suspension processing of the storage medium 25, allowing a continuation of the normal operation and improving user convenience.

The shutdown operation at step S5 may preferentially stop power supply to hardware, a function block, and a program those with relatively high power consumption, transmit an enable signal (a disable signal), and carry out processing to stop operations. Thereby, a block with relatively high power consumption is stopped first, suppressing total power consumption required for the shutdown operation. The suppressing of the total power consumption required for the shutdown operation allows for a reduction in the capacity of the backup power source 123 as well as a size and cost thereof.

After step S5, when there is the power supply from the solar power generation system 15 or the battery unit 16, the control unit 124, after the shutdown, may resume the operation of the energy management apparatus 12, that is, may carry out the restarting operation of the energy management apparatus 12 by using the power supply from the solar power generation system 15 or the battery unit 16. In this case, the control unit 124 preferably monitors the charging voltage value of the backup power source 123 and, when the charging voltage value is at the predetermined value or higher, controls the energy management apparatus 12 to start the system operation. Thereby, the backup power source 123 stores sufficient power and, in the event of a power failure after the restart, the energy management apparatus 12 may operate by using the power stored in the backup power source 123, and the data stored in the storage medium 25 may be securely protected.

Although the present invention has been described based on the figures and the embodiments, it is to be understood that various modifications and changes may be implemented based on the present disclosure by those who are ordinarily skilled in the art. Accordingly, such modifications and changes are included in the scope of the present invention. For example, functions and the like included in each means, each step and the like may be rearranged without logical inconsistency, so as to combine a plurality of means or steps together or to divide them.

REFERENCE SIGNS LIST

10 energy management system
11 communication terminal
12 energy management apparatus
13 smart meter
14 power conditioner
15 solar power generation system
16 battery unit
17 distribution board
18 load apparatus
25 storage medium
50 grid power source
60 system EMS
61 storage medium
70 network
121 communication unit
122 power input unit
123 backup power source
124 control unit

The invention claimed is:

1. An energy management apparatus provided to a power consumer's facility configured to manage at least a power state of a load apparatus or a distributed power source in the power consumer's facility, the energy management apparatus comprising:
    a storage medium;
    a power input unit that receives power supply;
    a backup power source that supplies power under a condition that a loss of power supply to the power input unit from a grid power source is detected; and
    a controller that
        detects the loss of power supply to the power input unit from the grid power source,
        determines whether or not the loss of power supply continues for a predetermined duration or more, under a condition that the loss of power supply to the power input unit from the grid power source is detected,
        carries out a suspension processing of the storage medium, under a condition that the loss of power supply is determined to continue for the predetermined duration or more,
        after carrying out the suspension processing of the storage medium, shuts down the energy management apparatus,
        detects whether or not the distributed power source starts to supply power after the power supply from the grid power source stops,
        monitors a charging amount of the backup power source, and
        resumes a system operation of the energy management apparatus, under a condition of detecting that the distributed power source has started to supply power and, simultaneously, the charging amount is at a predetermined value or more.

2. The energy management apparatus according to claim 1, wherein the predetermined value is a sum of a value of power necessary for the suspension processing of the storage medium and a value of power necessary for maintaining the system operation for the predetermined duration.

3. The energy management apparatus according to claim 1, wherein the backup power source has a capacity that allows for power supply to the energy management apparatus during both the predetermined duration and the suspension processing of the storage medium.

4. The energy management apparatus according to claim 1, wherein the predetermined duration is a maximum duration of a loss of power supply to be defined as a momentary power interruption by a power company, and a loss of power supply longer than the maximum duration is defined as a power failure.

5. The energy management apparatus according to claim 1, wherein the predetermined duration is two seconds.

6. A method of controlling an energy management apparatus provided to a power consumer's facility configured to manage a power state of a load apparatus or a distributed power source in the power consumer's facility, the method comprising:
   detecting a loss of power supply to a power input unit;
   supplying power from a backup power source, in a condition that the loss of power supply to a power input unit is detected;
   determining whether or not the loss of power supply continues for a predetermined duration or more, in a condition that the loss of power supply to the power input unit is detected;
   carrying out a suspension processing of a storage medium under a condition that the loss of power supply is determined to continue for the predetermined duration or more;
   shutting down the energy management apparatus after carrying out the suspension processing of the storage medium;
   detecting whether or not the distributed power source starts to supply power after the power supply from the grid power source stops;
   monitoring a charging amount of the backup power source; and
   resuming a system operation of the energy management apparatus, in a condition of detecting that the distributed power source has started to supply power and, simultaneously, the charging amount is at a predetermined value or more.

7. The method of controlling the energy management apparatus according to claim 6, wherein the predetermined value is a sum of a value of power necessary for the suspension of the storage medium and a value of power necessary for maintaining the system operation for the predetermined duration.

8. The method of controlling the energy management apparatus according to claim 6, wherein the backup power source has a capacity that allows for power supply to the energy management apparatus during both the predetermined duration and the suspension processing of the storage medium.

9. The method of controlling the energy management apparatus according to claim 6, wherein the predetermined duration is a maximum duration of a loss of power supply to be defined as a momentary power interruption by a power company, and a loss of power supply longer than the maximum duration is defined as a power failure.

10. The method of controlling the energy management apparatus according to claim 6, wherein the predetermined duration is two seconds.

* * * * *